United States Patent
Chen et al.

(10) Patent No.: US 10,852,950 B2
(45) Date of Patent: Dec. 1, 2020

(54) COMPUTER SYSTEM, MEMORY MANAGEMENT METHOD, AND NON-TRANSITORY COMPUTER READABLE MEDIUM

(71) Applicant: Realtek Semiconductor Corporation, Hsinchu (TW)

(72) Inventors: Yi-Cheng Chen, Hsinchu (TW); Yen-Fu Lai, Taoyuan (TW); Kun-Wei Wang, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 72 days.

(21) Appl. No.: 16/423,585

(22) Filed: May 28, 2019

(65) Prior Publication Data
US 2020/0167073 A1 May 28, 2020

(30) Foreign Application Priority Data
Nov. 22, 2018 (TW) .............................. 107141735 A

(51) Int. Cl.
*G06F 3/06* (2006.01)
(52) U.S. Cl.
CPC ............ *G06F 3/061* (2013.01); *G06F 3/0631* (2013.01); *G06F 3/0658* (2013.01); *G06F 3/0673* (2013.01)
(58) Field of Classification Search
CPC ................................................ G06F 3/06–0689
See application file for complete search history.

(56) References Cited

U.S. PATENT DOCUMENTS

| | | | | |
|---|---|---|---|---|
| 5,699,539 | A * | 12/1997 | Garber ................. | G06F 12/023 360/8 |
| 9,767,529 | B1 * | 9/2017 | Liu ...................... | H04N 19/426 |
| 2009/0125697 | A1 * | 5/2009 | Seo ....................... | G06F 12/023 711/171 |
| 2010/0070688 | A1 * | 3/2010 | Lin ...................... | G06F 12/0246 711/103 |
| 2011/0276745 | A1 * | 11/2011 | Danilak ............... | G11C 16/349 711/103 |
| 2012/0278532 | A1 * | 11/2012 | Bolanowski ........ | G11C 11/5628 711/103 |
| 2014/0078344 | A1 * | 3/2014 | Yoon ..................... | H04N 5/772 348/231.99 |
| 2016/0055097 | A1 * | 2/2016 | Ki ........................ | G06F 12/0871 711/160 |

FOREIGN PATENT DOCUMENTS

TW 201333696 A 8/2013
TW 201342068 A 10/2013

* cited by examiner

*Primary Examiner* — William E. Baughman
(74) *Attorney, Agent, or Firm* — Locke Lord LLP; Tim Tingkang Xia, Esq.

(57) ABSTRACT

A computer system, operated on a system platform, includes memories and a controller circuit. The memories include a first memory and a second memory, in which the first memory include s a first storage space and a second storage space, and a size of a total storage space of the second memory is the same as a size of the first storage space. The memories are coupled in parallel with the controller circuit, and the controller circuit assigns at least one first data zone to the first storage space and the second memory based on a kernel of the system platform, and assigns a second data zone to the second storage space. A data access frequency of the second data zone is lower than a data access frequency of the at least one first data zone.

15 Claims, 3 Drawing Sheets

COMPUTER SYSTEM, MEMORY MANAGEMENT METHOD, AND NON-TRANSITORY COMPUTER READABLE MEDIUM

RELATED APPLICATIONS

This application claims priority to Taiwan Application Serial Number 107141735, filed Nov. 22, 2018, which is herein incorporated by reference in its entirety.

BACKGROUND

Technical Field

The present disclosure relates to a computer system and a memory management method. More particularly, the present disclosure relates to the computer system, the memory management method, and a non-transitory computer readable medium which are applied to unsymmetrical storage spaces.

Description of Related Art

Electronic devices for media applications often employ memories to store processed video data. However, if unsymmetrical storage spaces were present in the memories, a transmission bandwidth of the system is limited. Accordingly, the performance of the electronic devices is reduced, resulting in poor user experiences.

SUMMARY

Some aspects of the present disclosure are to provide a computer system that is operated on a system platform. The computer system includes memories and a controller circuit. The memories include a first memory and a second memory, in which the first memory includes a first storage space and a second storage space, and a size of a total storage space of the second memory is the same as a size of the first storage space. The memories are coupled in parallel with the controller circuit, and the controller circuit assigns at least one first data zone to the first storage space and the second memory based on a kernel of the system platform, and assigns a second data zone to the second storage space. A data access frequency of the second data zone is lower than a data access frequency of the at least one first data zone.

Some aspects of the present disclosure are to provide a memory management method that includes following operations: assigning at least one first data zone to a first storage space of a first memory and a second memory based on a kernel of a system platform, in which a size of a total storage space of the second memory is the same as a size of the first storage space; and assigning a second data zone to a second storage space of the first memory, in which a data access frequency of the second data zone is lower than a data access frequency of the at least one first data zone.

Some aspects of the present disclosure are to provide a non-transitory computer readable medium having a computer program which, when executed by a processor, results in the processor performing multiple operations as follows: assigning at least one first data zone to a first storage space of a first memory and a second memory based on a kernel of a system platform, in which a size of a total storage space of the second memory is the same as a size of the first storage space; and assigning a second data zone to a second storage space of the first memory, in which a data access frequency of the second data zone is lower than a data access frequency of the at least one first data zone.

As described above, the computer system, the memory management method, and the non-transitory computer readable medium provided in embodiments of present disclosure are able to strike a balance between performance of the transmission bandwidth and efficient usage of the storage spaces, in order to reduce impacts from unsymmetrical storage spaces.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals.

Figure 1:
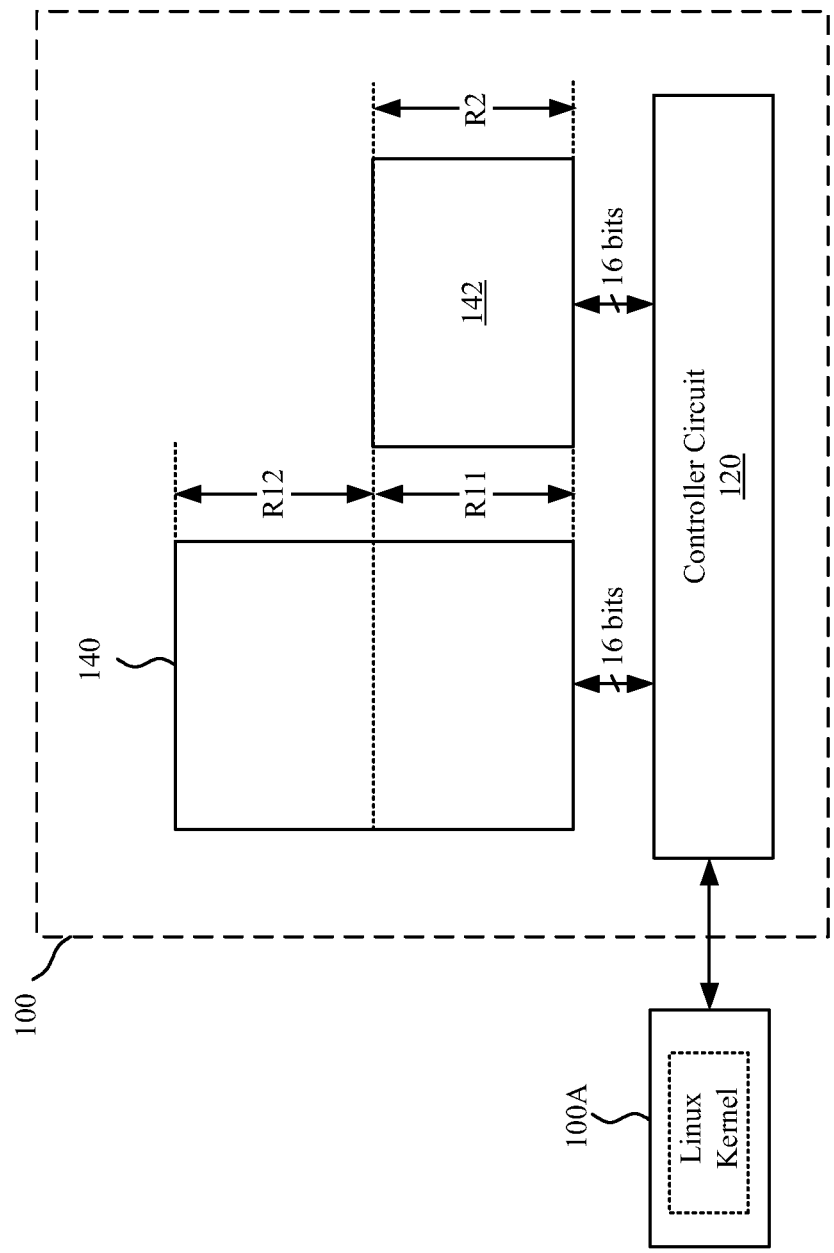
FIG. 1 is a schematic diagram of a computer system according to some embodiments of the present disclosure.

Reference is made to FIG. 1. FIG. 1 is a schematic diagram of a computer system 100 according to some embodiments of the present disclosure. In some embodiments, the computer system 100 may be an embedded system. For example, the computer system 100 may be applied to a circuitry for media application (e.g., a video card), but the present disclosure is not limited thereto.

In some embodiments, the computer system 100 may be coupled to one or more elements or functional units (e.g., circuits including processor(s), register(s), and so on) of a system platform 100A, and may configure related elements of the computer system 100 according to related rules of a kernel of the system platform 100A.

In some embodiments, the computer system 100 includes a controller circuit 120 and memories 140 and 142. The memories 140 and 142 are coupled in parallel with the controller circuit 120. The controller circuit 120 is configured to control read/write operations of the memories 140 and 142. In some embodiments, the memories 140 and 142 are dynamic random access memories. In some embodiments, the memories 140 and 142 may double data rate (DDR) memories or static random access memories. In some embodiments, the controller circuit 120 may be a circuit like a digital signal processor circuit, a processor, or a controller chip.

As shown in FIG. 1, the memory 140 includes a storage space R11 and a storage space R12, and a size of a total storage space R2 of the memory is the same as that of the storage space R11. In other words, a data capacity of the memory 140 and that of the memory 142 are unsymmetrical. In this example, the data capacity of the memory 142 is less than that of the memory 140. For example, a total storage space (e.g., a sum of the storage spaces R11 and R12) is 1 gigabyte (GB), and the total storage space R12 of the memory 142 is 512 megabyte (MB), in which each of the storage spaces R11 and R12 is 512 MB.

In some embodiments, a transmission bandwidth between the controller circuit 120 and the memory 140 is the same as that between the controller circuit 120 and the memory 142. For example, the transmission—bandwidth between the controller circuit 120 and each of the memories 140 and 142 is 16 bits. In some embodiments, a transmission bandwidth, supported by the system platform 100A to which the computer system is applied, may be 32 bits. Under this condition, the controller circuit 120 is able to simultaneously access data stored in the space R11 and that stored in the total storage space R2. As a result, the computer system 100 is able to simultaneously access data of the memories 140 and 142, and thus higher performance is achieved.

In some related approaches, if an unsymmetrical memory block (e.g., storage space R12) is accessed, the overall transmission bandwidth would be reduced by half (e.g., reduced to be 16 bits). Under this condition, as the transmission bandwidth is reduced, an additional time for retrieving data would be caused, and thus the overall performance is reduced.

Compared with these approaches, in some embodiments, the controller circuit 120 may perform related operations of a memory management method 200 in FIG. 2, as discussed below, in order to configure the memories 140 and 142 based on management rules of the system platform 100A. As a result, impact(s), resulting from unsymmetrical data space(s), on the computer system 100 can be reduced, in order to improve the overall performance.

Figure 2:
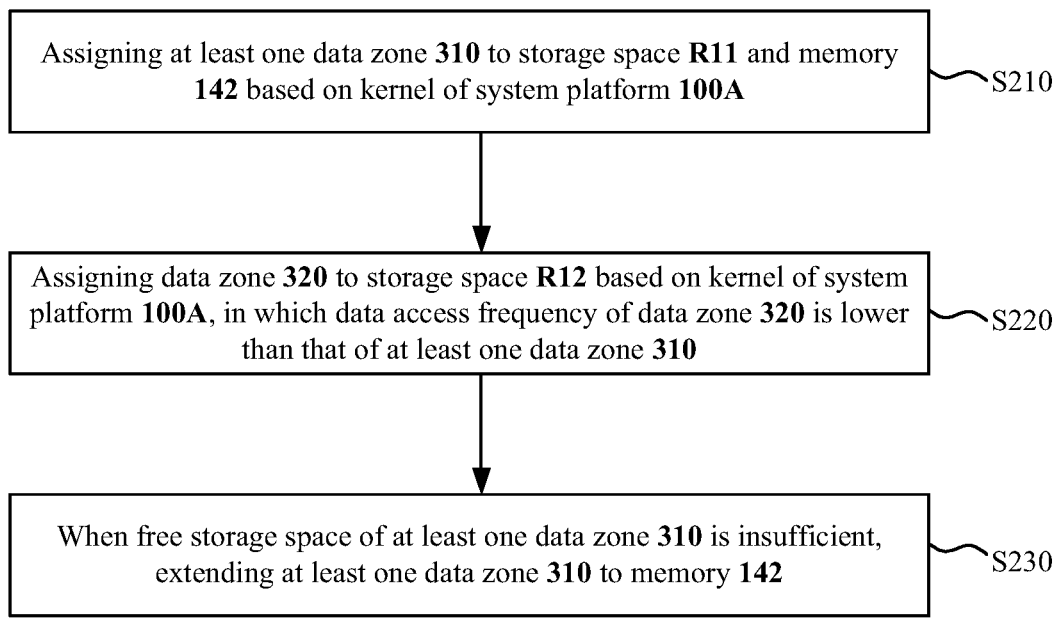
FIG. 2 is a flow chart of a memory management method according to some embodiments of the present disclosure.
Figure 3:
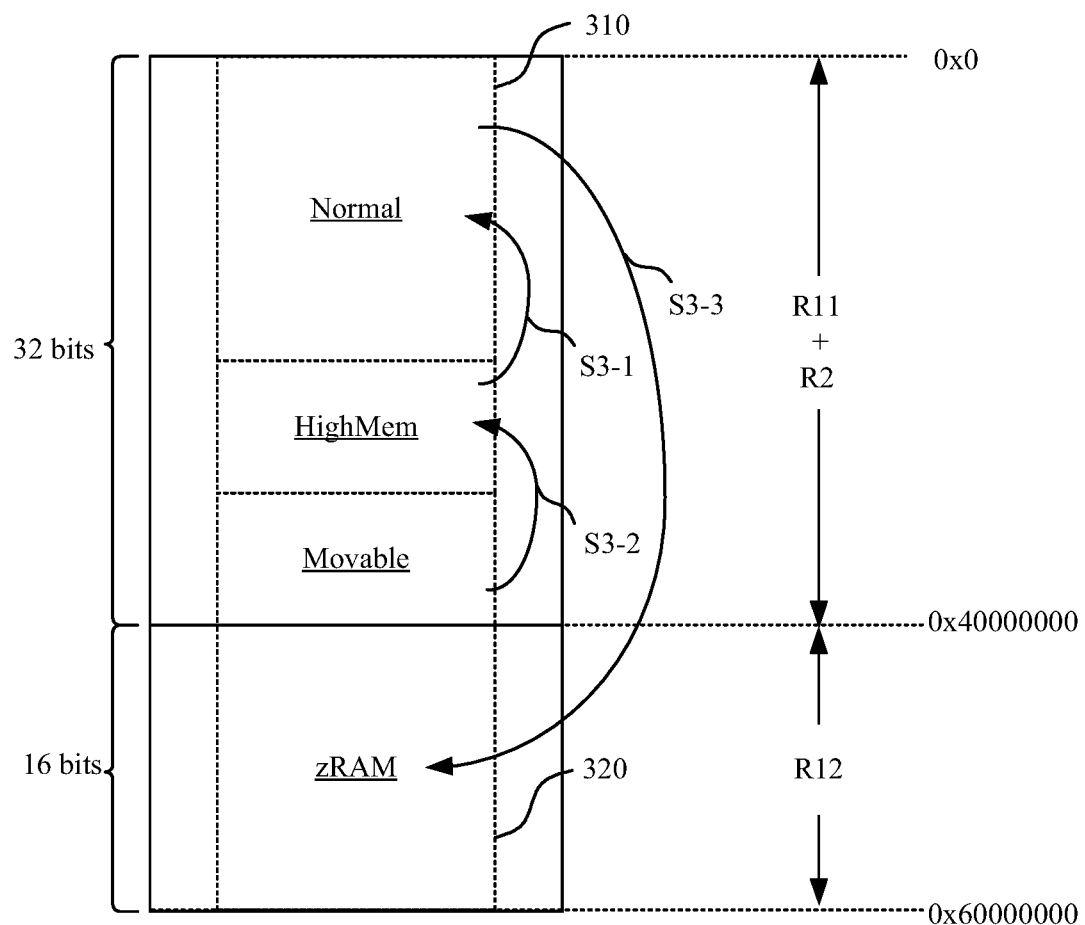
FIG. 3 is a schematic diagram of an arrangement of the memories in FIG. 1 according to some embodiments of the present disclosure.

Reference is made to both of FIG. 2 and FIG. 3. FIG. 2 is a flow chart of the memory management method 200 according to some embodiments of the present disclosure, and FIG. 3 is a schematic diagram of an arrangement of the memories 140 and 142 in FIG. 1 according to some embodiments of the present disclosure. For ease of understanding, the following descriptions are given with reference to the computer system 100 in FIG. 1.

In operation S210, at least one data zone 310 is assigned to the storage space R11 and the memory 142 based on a kernel of the system platform 100A.

In operation S220, a data zone 320 is assigned to the storage space R12 based on the kernel of the system platform 100A, in which a data access frequency of the data zone 320 is lower than that of the at least one data zone 310.

In some embodiments, the system platform 100A may be a Linux operating system. In these embodiments, as shown in FIG. 3, based on the memory management rules of the kernel of the Linux system, the at least one data zone 310 may include at least one of a "Normal data zone" (hereinafter referred to as "data zone Normal"), a "HighMem data zone" (hereinafter referred to as "data zone HighMem"), and/or a "Moveable data zone" (hereinafter referred to as "data zone Moveable"). The data zone Normal is for storing data of driver(s) associated with the kernel. The memory HighMem and the data zone Movable are provided to a user to store normal data. Under this condition, the controller circuit 120 may assign the data zone Normal, the data zone HighMem, and the data zone Movable to the storage space R11 and the total storage space R2 (i.e., memory 142) based on the memory management rules. In some embodiments, the controller circuit 120 may map the at least one data zone 310 to corresponding addresses of the memories 140 and 142.

For example, as shown in FIG. 3, a transmission bandwidth of a memory zone located from the address of "0x0" to the address of "0x40000000" is 32 bits, and such memory zone corresponds to the storage space R11 and the total storage space R2 in FIG. 1. A transmission bandwidth of a memory zone located from the address of "0x40000000" to the address of "0x60000000" is 16 bits, and such memory zone corresponds to the storage space R12 in FIG. 1. In some embodiments, the controller circuit 120 may assign the data zone Normal, the data zone HighMem, and the data zone Movable to the memory zone having the bandwidth of 32 bits.

Furthermore, in some embodiments, the controller circuit 120 may map the data zone 320 to a corresponding address of the memory 140. As a result, the controller circuit 120 may assign the data zone 320 to the memory zone having the bandwidth of 16 bits. In some embodiments, the data access frequency of the data zone 320 is lower than that of the at least one data zone 310. In some embodiments, each time interval for the data zone 320 being accessed is shorter than that for the at least one data zone 310 being accessed.

In some embodiments, the data zone 320 is configured to store data for applications having lower requirements of the memory bandwidth. In some embodiments, the data zone 320 is not set to store data processed by a video decoder, in which the data may include video data, audio data, information of user interface(s), and so on. In some embodiments, the data zone 320 is not set to store data generated from a hardware for processing video data with high frame per second (FPS). In some embodiments, the high FPS may be at least 60 FPS.

For example, as shown in FIG. 3, in some embodiments where the system platform 100A is a Linux operating system, the data zone 320 may include a compressed data zone zRAM. The compressed data zone zRAM is for storing compressed data that have been accessed for a certain time. With the above configuration, the at least one data zone 310 having higher data access frequency is assigned to the memory zone having higher transmission bandwidth, and the data zone 320 having lower data access frequency is assigned to the memory zone having lower transmission bandwidth. Compared with the above approaches, the impact(s), resulting from the data zone having lower transmission bandwidth, to the performance can be reduced.

With continued reference to FIG. 2, in operation S230, when a free storage space of the at least one data zone 310 is insufficient, the at least one data zone 310 is extended to the memory 142.

In some embodiments, if data stored in the data zone 320 do not occupy all of the storage space R12 and the free storage space of the at least one data zone 310 is insufficient, the controller circuit 120 may further extend the at least one data zone 310 to the storage space R12.

For example, based on the memory management rule of the kernel of Linux system, the memory is assigned from an area at a higher address fallback to an area at a lower address. For example, as shown by fallback sequence S3-2, if the data capacity of the data zone Movable is full, the controller circuit 120 requests the data zone HighMem at the lower address to provide a free storage space. If the data capacity is still insufficient, as shown by the fallback sequence S3-1, the controller circuit 120 further requests the data zone Normal at much lower address to provide a valid storage space.

If the data capacity has yet to be sufficient, as shown by the fallback sequence S3-3, the controller circuit 120 requests the memory 142 to provide a free storage space. Under this condition, if data stored in the compressed data zone zRAM do not occupy all of the storage space R12, a portion of the free storage space of the storage space R12 may be assigned to the at least one data zone 310. Equivalently, the controller circuit 120 extends the storage space of the at least one data zone 310 to the storage space R12.

With such configuration, the storage spaces of the memories 140 and 142 can be fully utilized while the transmission bandwidth can be used efficiently, in order to maintain the overall performance.

In some embodiments, the at least one data zone 310 may be storage blocks (not shown) of the memory 140, and the data zone 320 may be storage blocks (not shown) of the memory 142. In some embodiments, these storage blocks may be memory blocks, pages, etc.

The above Linux operating system and various types of the data zones are given for illustrative purposes, and the present disclosure is not limited thereto. Various suitable operating systems and various types of the data zones are within the contemplated scope of the present disclosure.

The above description of the memory management method 200 includes exemplary operations, but the operations of the memory management method 200 are not necessarily performed in the order described above. The order of the operations of the memory management method 200 can be changed, or the operations can be executed simultaneously or partially simultaneously as appropriate, in accordance with the spirit and scope of various embodiments of the present disclosure.

In some embodiments, the controller circuit 120 or the memory management method 200 may be implemented in hardware, software, firmware, and the combination thereof. For example, various circuits or units in the controller circuit 120 may be integrated into a single integrated circuit. In some embodiments, the memory management method 200 may be implemented with software or computer program having corresponding instructions, and may be stored in a non-transitory computer readable medium, in order to be accessed by a processor to perform the above operations. Alternatively, the controller circuit 120 may be implemented with a digital signal processing circuit that performs the memory management method 220. In some other embodiments, various circuits or units of the controller circuit 120 may implemented with the cooperation of hardware, software, and firmware. In different embodiments, practical implementations of the controller circuit 120 and/or the memory management method 20 can be selected according to practical requirements.

In some embodiments, the non-transitory computer readable medium is an electronic, magnetic, optical, electromagnetic, infrared, and/or a semiconductor system (or apparatus or device). For example, the non-transitory computer readable medium includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium includes a compact disk-read only memory (CD-ROM), a compact disk-read/write (CD-R/W), and/or a digital video disc (DVD).

As described above, the computer system, the memory management method, and the non-transitory computer readable medium provided in embodiments of present disclosure are able to strike a balance between performance of the transmission bandwidth and efficient usage of the storage spaces, in order to reduce impacts from unsymmetrical storage spaces.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computer system, operated on a system platform, the computer system comprising:
   a plurality of memories comprising a first memory and a second memory, wherein the first memory comprises a first storage space and a second storage space, and a size of a total storage space of the second memory is the same as a size of the first storage space; and
   a controller circuit, wherein the plurality of memories are coupled in parallel with the controller circuit, and the controller circuit is configured to, based on a kernel of the system platform, assign at least one first data zone to the first storage space and the second memory, and to assign a second data zone to the second storage space,
   wherein a data access frequency of the second data zone is lower than a data access frequency of the at least one first data zone.

2. The computer system of claim 1, wherein in response to a data capacity of the at least one first data zone being insufficient, the controller circuit is further configured to extend the at least one first data zone to the second storage space.

3. The computer system of claim 2, wherein in response to the data capacity of the at least one first data zone being insufficient, the controller circuit is further configured to request the second memory to provide a free storage space to the at least one first data zone, in order to extend the at least one first data zone to the second storage space.

4. The computer system of claim 1, wherein if the system platform is a Linux operating system, the at least one first data zone comprises at least one of a normal data zone, a HighMem data zone, or a Movable data zone.

5. The computer system of claim 1, wherein if the system platform is a Linux operating system, the second data zone comprises a compressed data (zRAM) zone.

6. A memory management method comprising:
    assigning at least one first data zone to a first storage space of a first memory and a second memory based on a kernel of a system platform, wherein a size of a total storage space of the second memory is the same as a size of the first storage space; and
    assigning a second data zone to a second storage space of the first memory, wherein a data access frequency of the second data zone is lower than a data access frequency of the at least one first data zone.

7. The memory management method of claim 6, further comprising:
    in response to a data capacity of the at least one first data zone being insufficient, extending the at least one first data zone to the second storage space.

8. The memory management method of claim 7, wherein extending the at least one first data zone to the second storage space comprises:
    in response to the data capacity of the at least one first data zone being insufficient, requesting the second memory to provide a free storage space to the at least one first data zone, in order to extend the at least one first data zone to the second storage space.

9. The memory management method of claim 6, wherein if the system platform is a Linux operating system, the second data zone comprises a compressed data (zRAM) zone.

10. The memory management method of claim 6, wherein if the system platform is a Linux operating system, the at least one first data zone comprises at least one of a normal data zone, a HighMem data zone, or a Movable data zone.

11. A non-transitory computer readable medium having a computer program which, when executed by a processor, result in the processor performing a plurality of operations comprising:
    assigning at least one first data zone to a first storage space of a first memory and a second memory based on a kernel of a system platform, wherein a size of a total storage space of the second memory is the same as a size of the first storage space; and
    assigning a second data zone to a second storage space of the first memory, wherein a data access frequency of the second data zone is lower than a data access frequency of the at least one first data zone.

12. The non-transitory computer readable medium of claim 11, wherein the plurality of operations further comprises:
    in response to a data capacity of the at least one first data zone being insufficient, extending the at least one first data zone to the second storage space.

13. The non-transitory computer readable medium of claim 12, extending the at least one first data zone to the second storage space comprises:
    in response to the data capacity of the at least one first data zone being insufficient, requesting the second memory to provide a free storage space to the at least one first data zone, in order to extend the at least one first data zone to the second storage space.

14. The non-transitory computer readable medium of claim 11, wherein if the system platform is a Linux operating system, the second data zone comprises a compressed data (zRAM) zone.

15. The non-transitory computer readable medium of claim 11, wherein if the system platform is a Linux operating system, the at least one first data zone comprises at least one of a normal data zone, a HighMem data zone, or a Movable data zone.

* * * * *